US012448823B1

(12) United States Patent
Waites

(10) Patent No.: US 12,448,823 B1
(45) Date of Patent: Oct. 21, 2025

(54) DOOR HANDLE AND LOCKING SYSTEM

(71) Applicant: Global Link Distribution, Corp., Elkhart, IN (US)

(72) Inventor: Christopher J. Waites, Frankenmuth, MI (US)

(73) Assignee: Global Link Distribution, Corp., Elkhart, IN (US)

( * ) Notice: Subject to any disclaimer, the term of this patent is extended or adjusted under 35 U.S.C. 154(b) by 176 days.

(21) Appl. No.: 18/386,036

(22) Filed: Nov. 1, 2023

Related U.S. Application Data

(60) Provisional application No. 63/421,408, filed on Nov. 1, 2022.

(51) Int. Cl.
*E05B 83/44* (2014.01)
*E05B 85/10* (2014.01)
*E05B 85/14* (2014.01)

(52) U.S. Cl.
CPC ............ *E05B 85/103* (2013.01); *E05B 83/44* (2013.01); *E05B 85/14* (2013.01)

(58) Field of Classification Search
CPC ......... E05B 85/103; E05B 83/44; E05B 85/14
See application file for complete search history.

(56) References Cited

U.S. PATENT DOCUMENTS 2,987,908 A 6/1961 Pelcin
3,055,204 A 9/1962 Pelcin
3,081,617 A 3/1963 McKay
3,283,549 A 11/1966 Mees
3,357,734 A * 12/1967 Pastva, Jr. ............... E05C 1/145 292/165
3,576,118 A * 4/1971 Doerrfeld ............... E05C 1/145 70/489
3,668,907 A 6/1972 Pastva, Jr.
4,060,267 A 11/1977 Monfardini
4,911,487 A 3/1990 Rachocki
5,299,844 A 4/1994 Gleason
5,439,260 A 8/1995 Weinerman et al.
5,586,458 A 12/1996 Weinerman et al.
5,820,175 A 10/1998 Clavin
5,927,773 A * 7/1999 Larsen .................... E05C 1/145 292/DIG. 31
6,174,007 B1 * 1/2001 Schlack .................. E05B 13/10 292/DIG. 31
D459,969 S 7/2002 Larsen et al.
(Continued)

FOREIGN PATENT DOCUMENTS

GB 1313461 A 4/1973

*Primary Examiner* — Kristina R Fulton
*Assistant Examiner* — Thomas L Neubauer
(74) *Attorney, Agent, or Firm* — Barnes & Thornburg LLP

(57) ABSTRACT

A door handle and locking system includes an exterior housing, a handle, a biasing member, an actuator, a lock, an interior housing, a latching mechanism, and a catch member. The latching mechanism includes a cam member having an arm, a latch member, and a biasing member. When the handle is moved from a latched position to an unlatched position, the actuator engages the arm of the cam member, which pivots the cam member and causes rotation of the latch member under the force of the biasing member, thereby disengaging latch member from the catch member. The actuator and cam member are configured for use with doors of differing thicknesses.

4 Claims, 17 Drawing Sheets

(56) References Cited

U.S. PATENT DOCUMENTS

| | | | | |
|---|---|---|---|---|
| 6,513,353 | B1 | 2/2003 | Weinerman et al. | |
| 6,547,290 | B1 | 4/2003 | Zenner et al. | |
| D504,803 | S | 5/2005 | Misner et al. | |
| 7,313,937 | B2 | 1/2008 | Straka, Jr. | |
| 7,584,634 | B2 | 9/2009 | Hoffman | |
| D674,678 | S | 1/2013 | Pickar et al. | |
| 8,347,667 | B2 | 1/2013 | Bacon | |
| 8,579,337 | B2 | 11/2013 | Hidding et al. | |
| 9,482,029 | B2 | 11/2016 | Le | |
| 9,816,299 | B2 | 11/2017 | Pickar | |
| 2005/0284199 | A1 | 12/2005 | Gulley et al. | |
| 2012/0192602 | A1 * | 8/2012 | Bacon | E05B 47/026<br>70/278.1 |
| 2013/0133384 | A1 * | 5/2013 | Pickar | E05B 85/12<br>70/91 |
| 2023/0069249 | A1 * | 3/2023 | Bos | G07C 9/00658 |

* cited by examiner

DOOR HANDLE AND LOCKING SYSTEM

CROSS-REFERENCE TO RELATED APPLICATIONS

This application claims priority to U.S. Patent Application Ser. No. 63/421,408, filed Nov. 1, 2022, and incorporates the application by reference in its entirety.

BACKGROUND AND SUMMARY OF THE INVENTION

The present invention relates to a door handle and locking system.

Various door handles and locking systems are known. Such systems are often utilized in connection with vehicle doors, such as, for example, cargo or storage hatch doors on vehicles such as recreational vehicles. Many of these systems utilize a handle to actuate a latching mechanism to selectively maintain the door in and release the door from the closed position. Such systems also often utilize a lock to prevent unauthorized opening of the door after it is placed in the closed position. Examples of such door handle and locking systems are shown in U.S. Pat. Nos. 5,299,844 and 8,347,667.

In one embodiment of the present invention, a door handle and locking system includes an exterior housing, a handle, a biasing member, an actuator, a lock, an interior housing, a latching mechanism, and a catch member. The exterior housing has an outer side, an inner side, a rear wall, a first side wall having an opening, a second side wall having an opening, and a recessed area. The handle is located in the recessed area of the exterior housing and is moveable between a latched position and an unlatched position. The handle has an outer side, an inner side, a first side, a second side, an upper side, and a lower side, a first arm extending from the inner side of the handle, the first arm having an opening aligned with the opening in the first side wall of the exterior housing, the opening of the first arm having a configuration, a second arm extending from the inner side of the handle, the second arm having an opening aligned with the opening in the second side wall of the exterior housing, the opening in the second arm having a configuration, and an opening extending through the inner side and the outer side of the handle. The biasing member is located on the second side of the exterior housing and has a retainer and a spring. The retainer has a post having a configuration corresponding to the opening in the first arm of the handle, an opening, and an arm. The post extends into the opening in the second side wall of the handle and into the opening in the second arm of the handle and is oriented such that the post does not rotate within the opening in the second arm of the handle. The spring is positioned around the post on one side of the arm of the retainer and engages the arm of the retainer. The actuator has a boss having a configuration corresponding to the configuration of the opening in the second arm of the handle, an opening in the boss, a first surface, and a length. The actuator is located on the second side of the exterior housing with the boss extending into the opening in the first side wall of the exterior housing, into the opening in the first arm of the handle, and oriented such that the boss does not rotate within the opening in the first arm of the handle. A first fastener extends into the opening in the boss, the opening in the first side wall of the exterior housing, and the opening in the first arm of the handle. A second fastener extends into the opening in the retainer, the opening in the second side wall of the exterior housing and the opening in the second arm of the handle. The handle is pivotally connected to the exterior housing, the biasing member biases the handle into the closed position with the actuator extending substantially perpendicular to the rear wall of the exterior housing, and the actuator and the retainer rotate with movement of the handle between the latched position and the unlatched position. The lock is located in the opening extending from the inner side of the handle to the outer side of the handle. The lock is selectively moveable between a locked position and an unlocked position. The interior housing has an outer side, an inner side, a rear wall, a first side wall, a second side wall, an upper wall, and a lower wall. The second side wall of the interior housing has a first recessed area having an opening, and the interior housing has a second recessed area. The latching mechanism is moveable between a latched position and an unlatched position. The latching mechanism has a housing, a cam member located in the housing, a latch member located in the housing, a first biasing member located in the housing, and a second biasing member located in the housing. The cam member has a body section, a cam arm extending from the body section, a retaining projection extending from the body section. The cam arm has a first end. The latch member has a first end, a second end, a first notch formed in the first end, a second notch formed in the second end and a third notch formed in the second end. The housing of the latch mechanism is located on the inner side of interior housing and in the first recessed area of the interior housing such that the cam arm extends from the inner side of the interior housing and through the opening in the first recessed area of the interior housing and the end of the cam arm is located on the outer side of the interior housing and in the second recessed area of the interior housing. The catch member has a catch feature configured to engage the latching mechanism when the latching mechanism is in the latched position. When the latching mechanism is in the latched position, the retaining projection of the cam member is located in the second notch of the latch member, the catch feature of the catch member is located in the first notch of the latch member, and the first biasing member and second biasing member bias the retaining projection of the cam member and the second notch of the latch member out of engagement. Moving the handle from the latched position to the unlatched position rotates the actuator so as to apply force to the cam arm and cause the cam arm to move along the lower surface of the actuator, thereby pivoting cam member in a first direction and disengaging the retaining projection from the second notch of the latch member and causing rotation of the latch member in the first direction under the biasing force of the second biasing member to disengage the first notch of the latch member from the catch feature.

In one embodiment, the first end of the latch member bears against the catch member as the first notch disengages from the catch feature and urges the latch member away from the catch member In another embodiment, urging the first end of the latch member into engagement with the catch feature causes the latch member to rotate in a second direction, thereby causing the second end of the latch member to contact the retaining projection of the cam member and rotate the cam member in the first direction until the retaining projection engages the third notch of the latch member and the first notch of the latch member partially engages the catch feature.

In yet another embodiment, the exterior housing is configured to be connected to the exterior side of a first door having a thickness and to the exterior side of a second door having a thickness different from the thickness of the first door, the interior housing is configured to be installed on the interior side of the first door and on the interior side of the second door, and the cam arm and actuator are configured to engage at a first location when the interior housing and the exterior housing are installed on the first door and to engage at a second location when the exterior housing and interior housing are installed on the second door.

These and other features of the present invention will be apparent from the following detailed description and accompanying drawings.

DETAILED DESCRIPTION OF EMBODIMENTS OF THE INVENTION

Figure 3:
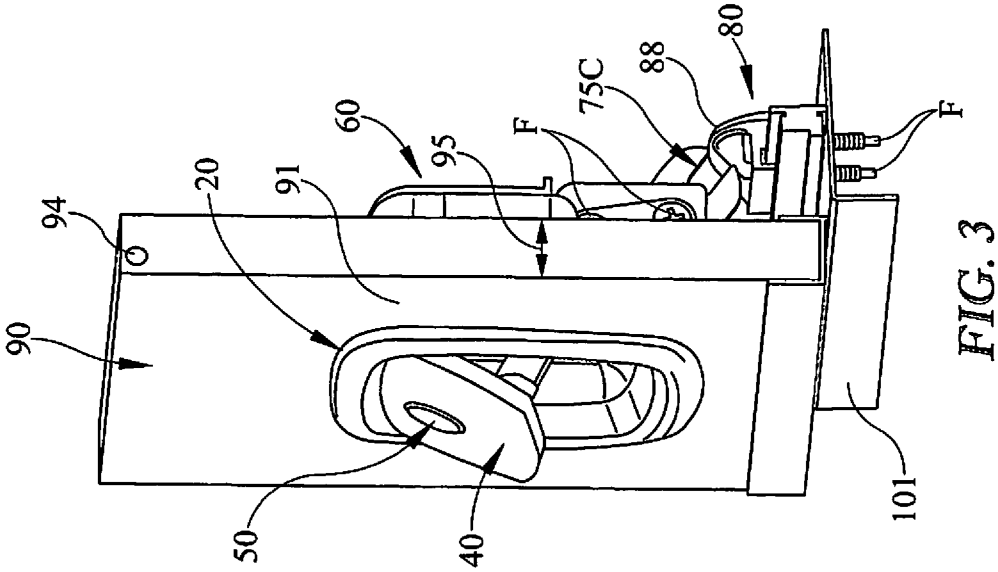
FIG. 3 is a perspective view of the door handle and locking system as shown in FIG. 2.

Referring to FIGS. 1-3 and 19-22, a door handle and locking system 10 according to one embodiment of the present invention generally includes a first or exterior housing 20, an actuator 30, a handle 40, a lock 50, a second or interior housing 60, a latching mechanism 70, and a strike or catch member 80.

Figure 4:
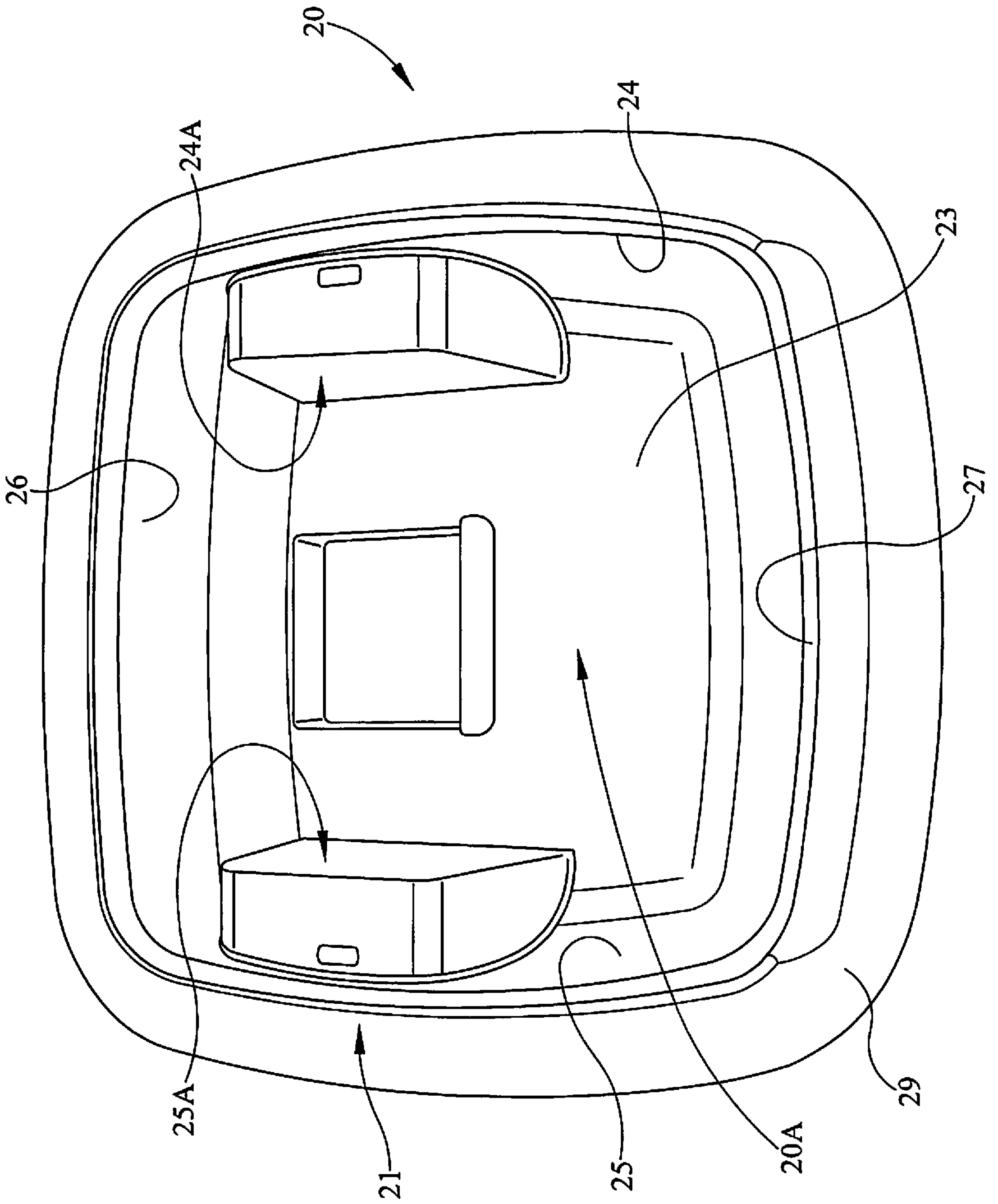
FIG. 4 is a front view of a first housing that is a component of the door handle and locking system shown in FIG. 1.
Figure 5:
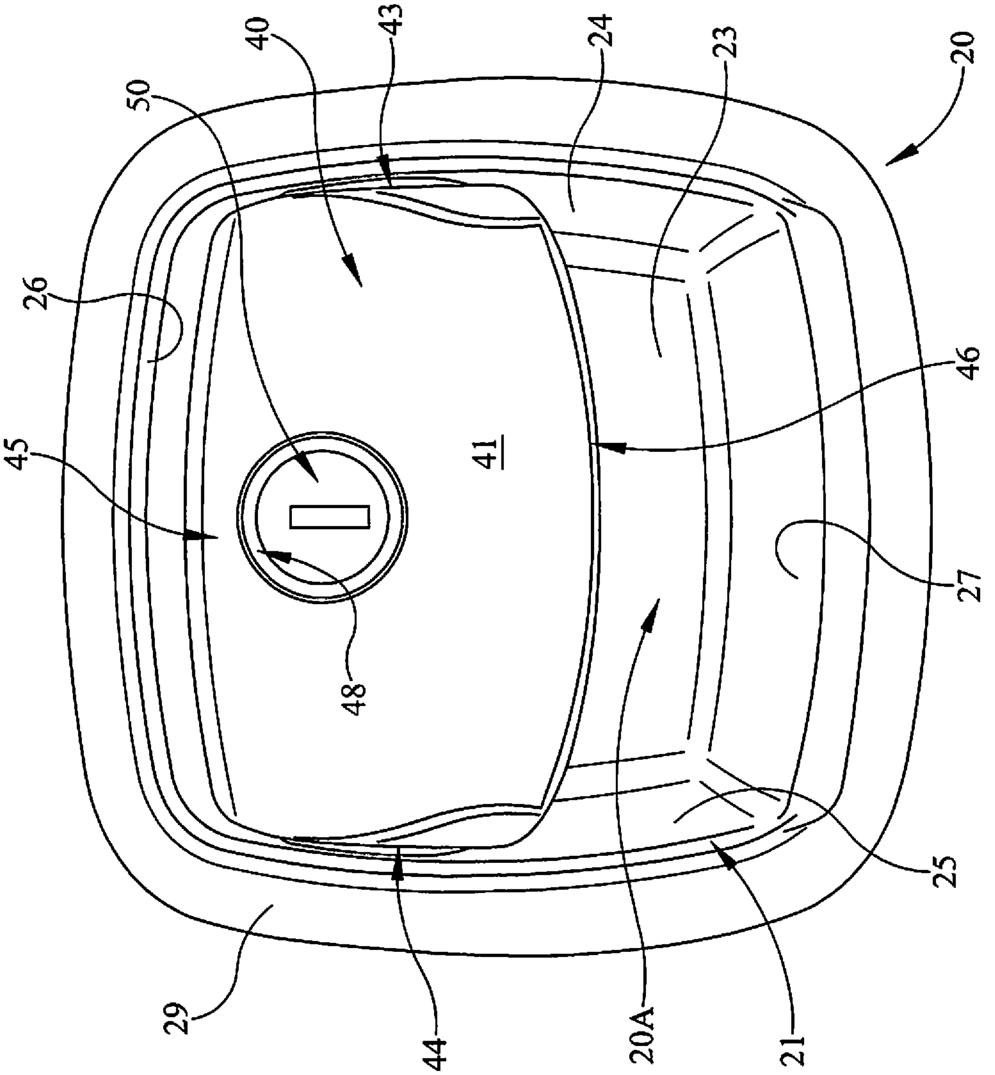
FIG. 5 is a front view of the first housing shown in FIG. 4 with a handle and lock that are components of the door handle and locking system of FIG. 1 installed in the first housing.
Figure 6:
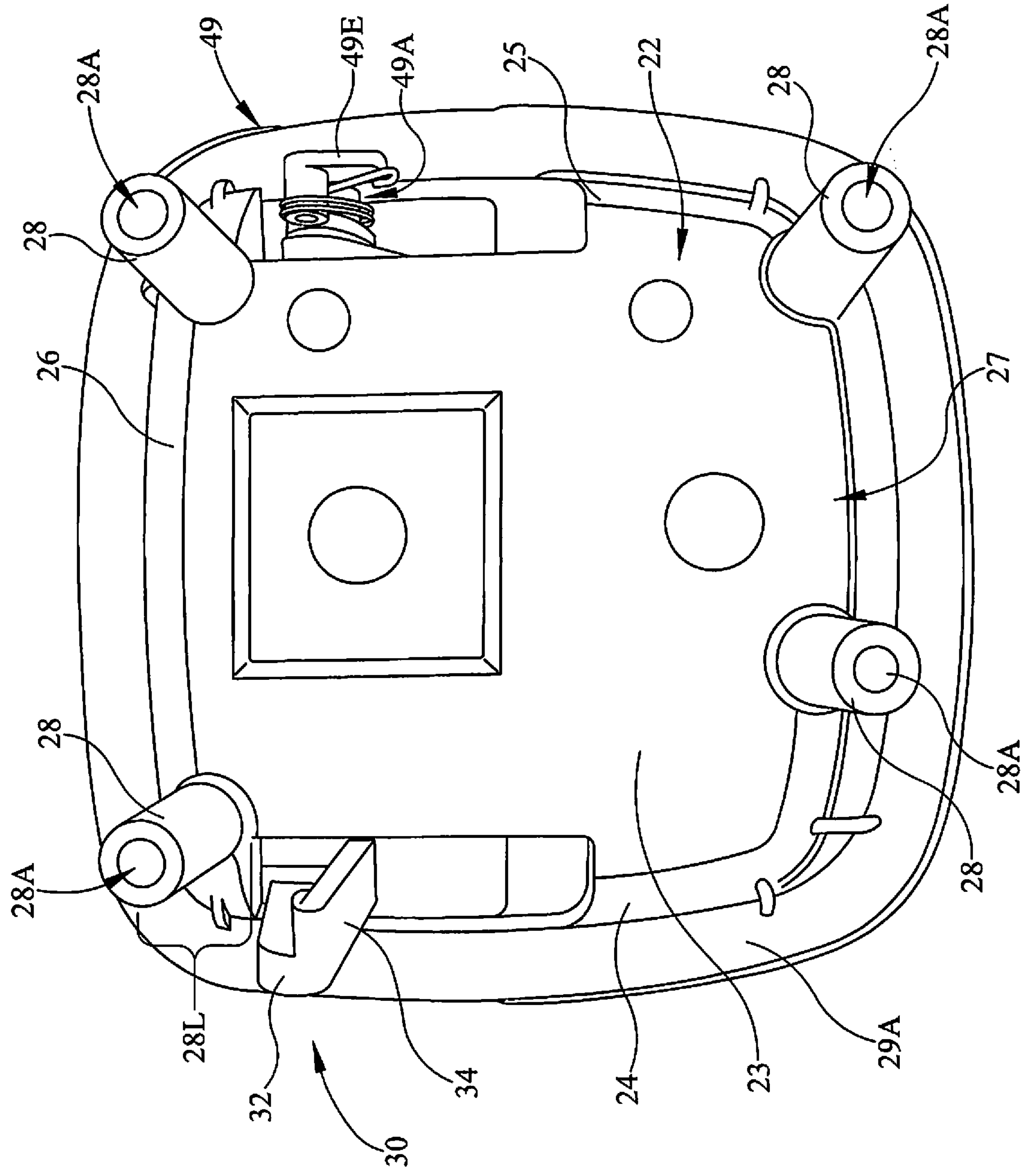
FIG. 6 is a rear view of the first housing, handle and lock as shown in FIG. 4 further showing a actuator and biasing mechanism that are components of the door handle and locking system of FIG. 1.

Referring to FIGS. 4-6, in the embodiment shown, first housing 20 includes a first or outer side 21, a second or inner side 22, a first or rear wall 23, a second or right side wall 24, a third or left side wall 25, a fourth or upper wall 26, a fifth or lower wall 27, a plurality of posts or bosses 28, and a flange 29. Second wall 24 includes an opening 24A and third wall 25 includes an opening 25A. Openings 24A and 25A receive fasteners for securing actuator 30 and handle 40 to first housing 20 as described below. Second wall 24, third wall 25, fourth wall 26, and fifth wall 27 extend from first wall 23 toward flange 29 and first side 21 of first housing 20 and form a recessed area 20A. Flange 29 extends outward from and generally perpendicular to second wall 24, third wall 25, fourth wall 26, and fifth wall 27. Flange 29 extends generally parallel to first wall 23. A seal 29A extends around flange 29 on second side 22 of first housing 20. Bosses 28 extend from first wall 23 away from flange 29. Each boss 28 includes an opening or bore 28A extending at least partially along the length 28L of each boss 28. Length 28L may be the same for all bosses 28, different for all bosses 28, or the same for some bosses 28 and different for other bosses 28.

Figure 7:
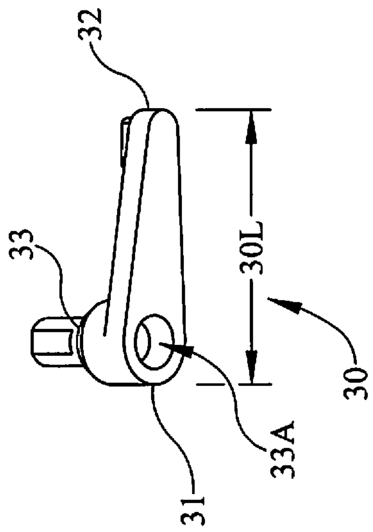
FIG. 7 is a perspective view of the actuator shown in FIG. 6.
Figure 10:
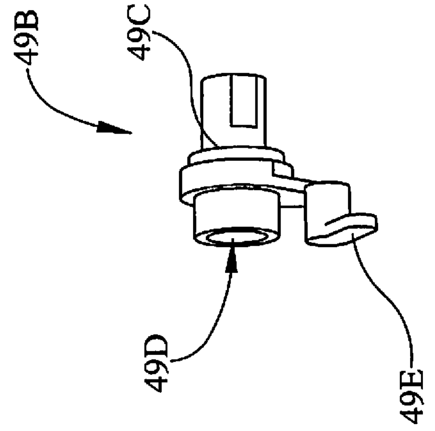
FIG. 10 is a perspective view of a retainer that is a component of the biasing mechanism shown in FIG. 6.
Figure 8:
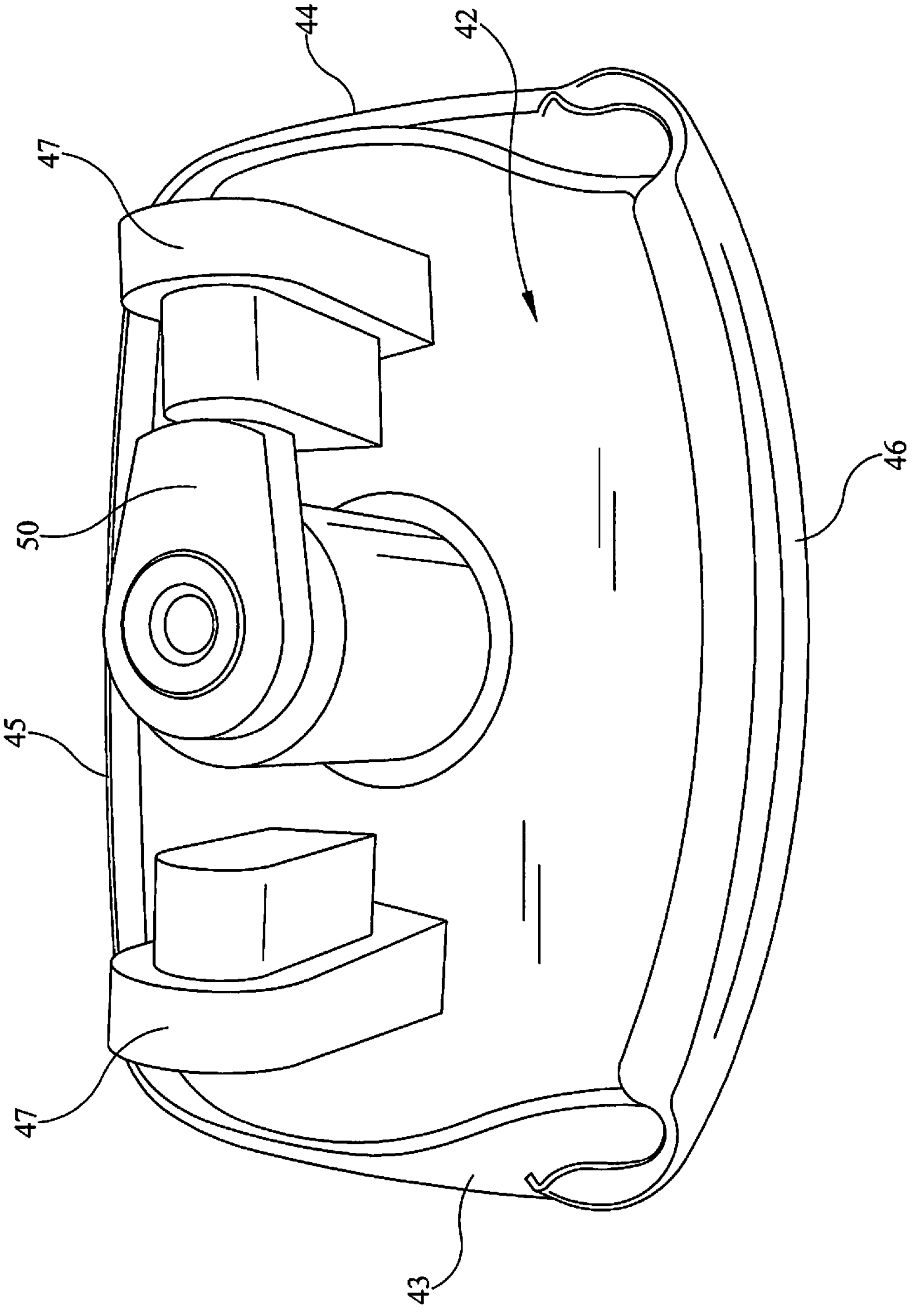
FIG. 8 is a rear view of the handle shown in FIG. 4.
Figure 9:
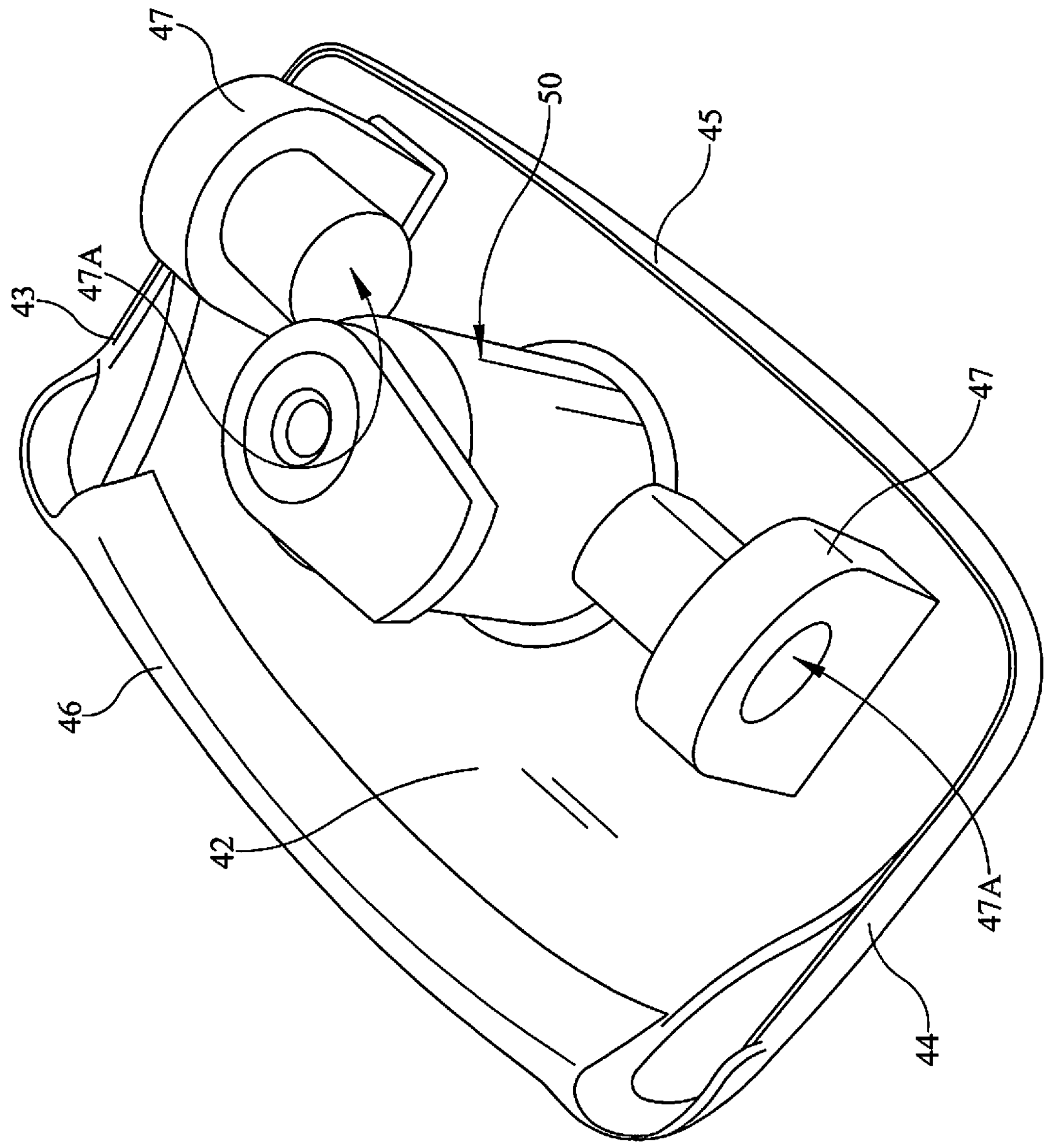
FIG. 9 is rear perspective view of the handle shown in FIG. 4.

Referring to FIGS. 6 and 7, in the embodiment shown, actuator 30 includes a first end 31, a second end 32, a boss 33 having an opening 33A, a first or lower surface 34, and a length 30L. Opening 33A in the embodiment shown is located adjacent first end 31 of actuator 30 and receives a fastener that secures actuator 30 to first housing 20 as described below.

Referring to FIGS. 5, 6, and 8-10, handle 40 in the embodiment shown includes a first or outer side 41, a second or inner side 42, a third or right side 43, a fourth or left side 44, a fifth or upper side 45, a sixth or lower side 46, a pair of arms 47, an opening 48, and a biasing mechanism 49. Arms 47 extend from second side 42 of handle 40 near fifth side 45 and away from first side 41. Each arm 47 has an opening or bore 47A. Opening 48 extends through first side 41 and second side 42 of handle 40 and receives lock 50 as described below. Biasing mechanism 49, in the embodiment shown, includes a spring 49A and a retainer 49B. Retainer 49B includes a post 49C, an opening 49D and an arm 49E positioned along post 49C. Spring 49A is positioned around post 49C on one side of arm 49E and engages arm 49E. Opening 49D receives a fastener to secure retainer 49B to first housing 20 as described below.

Figure 19:
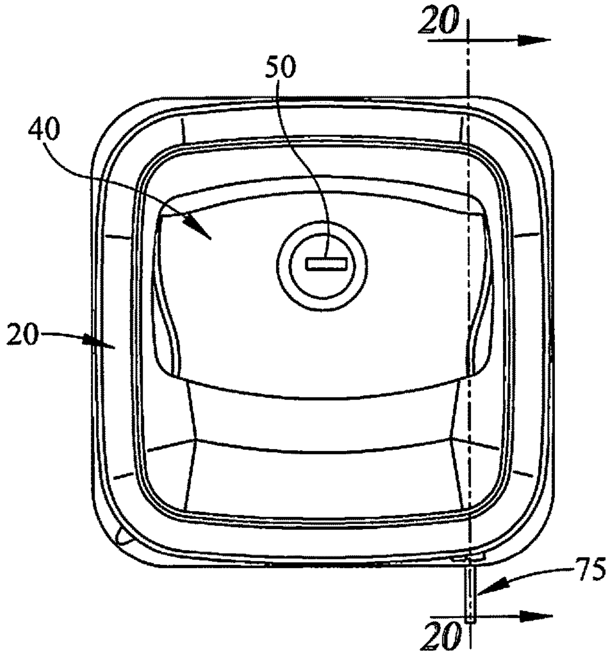
FIG. 19 is a front view of the door handle and locking system shown in FIG. 1 in the latched position.
Figure 22:
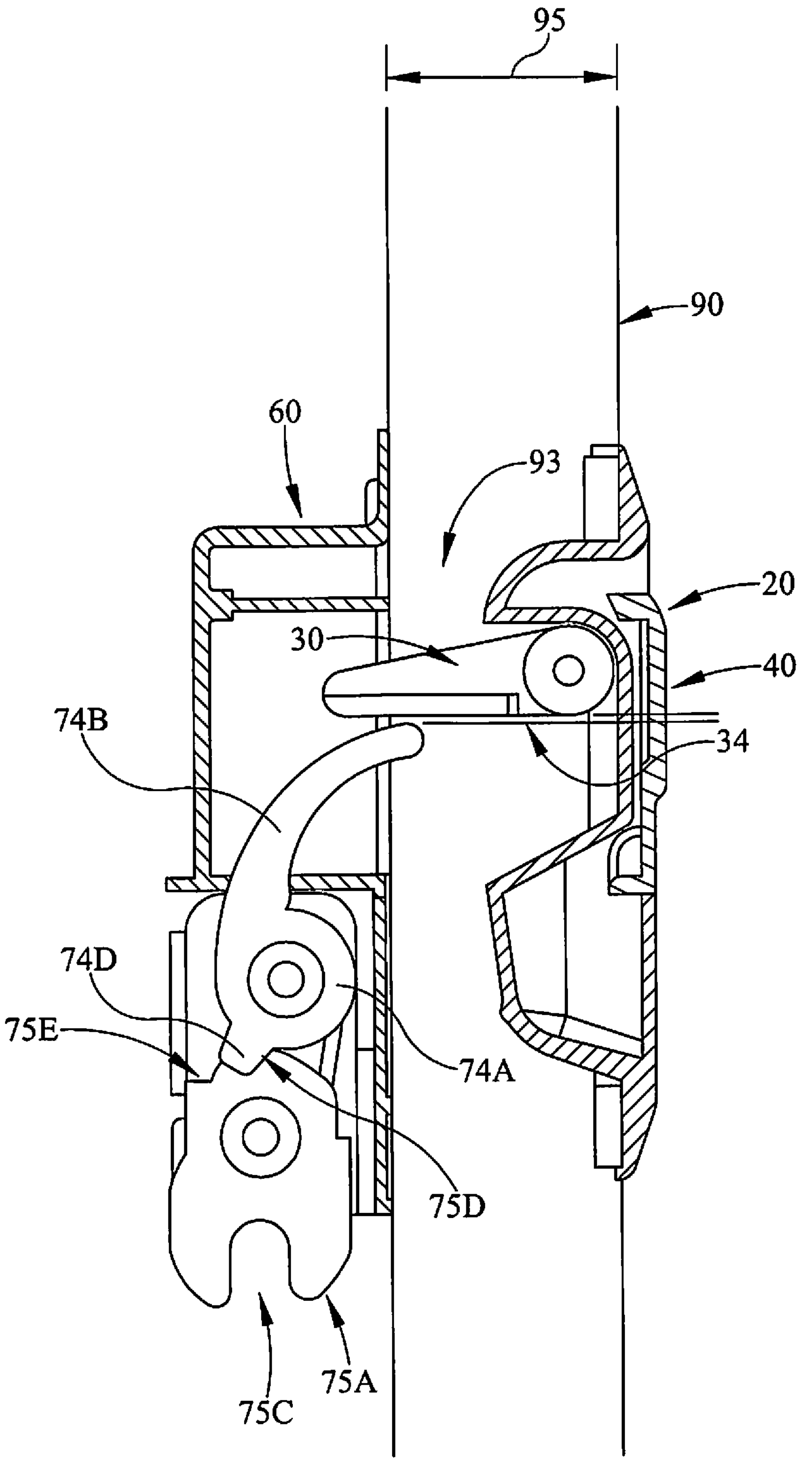
FIG. 22 is a sectional view through line 20-20 in FIG. 19 showing the door handle and locking system shown in FIG. 1 in the latched position as mounted to a door having a second thickness greater than that of the door in FIG. 20.

Handle 40 is positioned in recessed area 20A and secured to first housing 20 by one or more fasteners (not shown). The fasteners may be screws, pins, rivets or other retaining members that connect actuator 30, handle 40, and biasing mechanism 49 to first housing 20 and permit actuator 30, handle 40, and biasing member 49 to pivot as described below. In the embodiment shown, actuator 30, handle 40, and biasing member 49 are secured to first housing 20 by two fasteners. To secure actuator 30 and handle 40 to first housing 20, handle 40 is positioned in recessed area 20A of first housing 20 such that opening 47A in one arm 47 is aligned with opening 24A in second wall 24 of first housing 20 and opening 47A in the other arm 47 is aligned with opening 25A in third wall 25 of first housing 20. Actuator 30 is positioned on second side 21 of first housing 20 such that boss 33 extends into opening 24A in second wall 24 of first housing 20 and into an opening 47A in one arm 47 of handle 40. A first fastener is inserted through opening 33A in actuator 30, opening 24A in second wall 24 of first housing 20, and into opening 47A in arm 47 of handle 40. Biasing mechanism 49 is positioned on second side 21 of first housing 20 such that post 49C extends into opening 25A in third wall 25 of first housing 20 and opening 47A of the arm 47 adjacent third wall 25 of first housing 20. A second fastener is inserted through opening 49D in retainer 49B, opening 25A in third wall 25 of first housing 20, and into opening 47A in arm 47 of handle 40. The fasteners can be secured in place with a nut or other retaining member. Alternatively, one or more of openings 24A, 25A, 33A, 49D, and 47A can be threaded or otherwise configured to retain the fasteners in place. The fasteners can also be self-securing members, such a rivets. As assembled, biasing mechanism 49 biases actuator 30 and handle 40 such that actuator 30 extends generally perpendicular to first wall 23 of first housing 20 and handle 40 extends generally parallel to first wall 23 of first housing 20 as shown in FIGS. 5, 19 and 22. Note that boss 33 of actuator 30, openings 47A of arms 47 of handle 40, and post 49C of retainer 49B are provided with corresponding keyed surfaces. In the embodiment shown, boss 33, openings 47A, and post 49C have a plurality of flat surfaces. In this manner, boss 33 and post 49C cannot rotate in openings 47A. Rather, applying force to lower side 46 of handle 40 so as to move it outward from recessed area 20A causes handle 40, actuator 30 and retainer 49B to pivot together as described below.

Lock 50 in the embodiment shown extends through opening 48 in handle 40. Lock 50 can be any of a number of commercially available locks. In the embodiment shown, lock 50 is a cylinder lock that can be selectively locked and unlocked by use of a key as is known in the art to either permit or prevent movement of handle 40.

Figure 11:
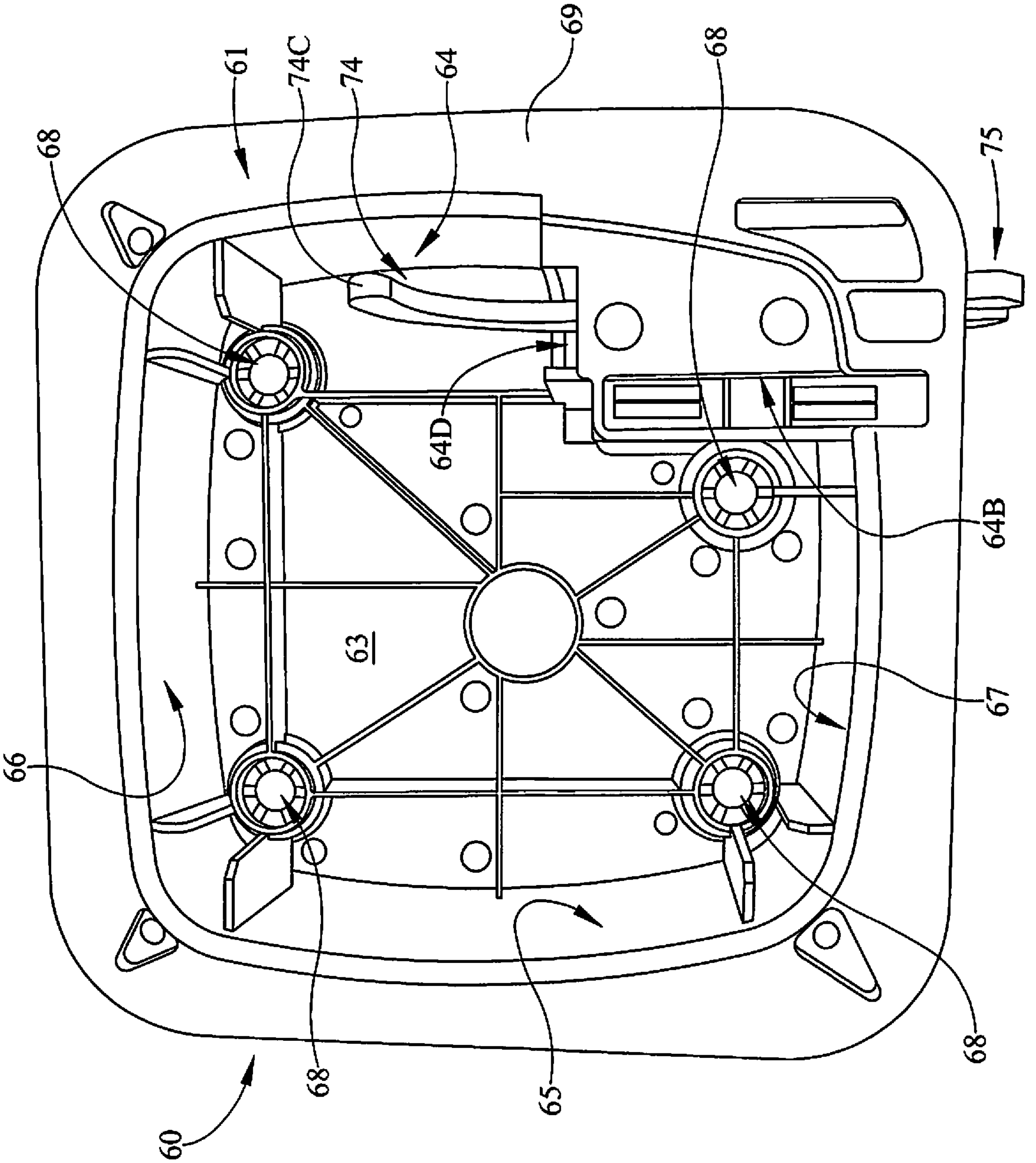
FIG. 11 is a front view of a second housing that is a component of the door handle and locking system shown in FIG. 1 with a latching mechanism that is a component of the door handle and locking system shown in FIG. 1 installed in the second housing.
Figure 12:
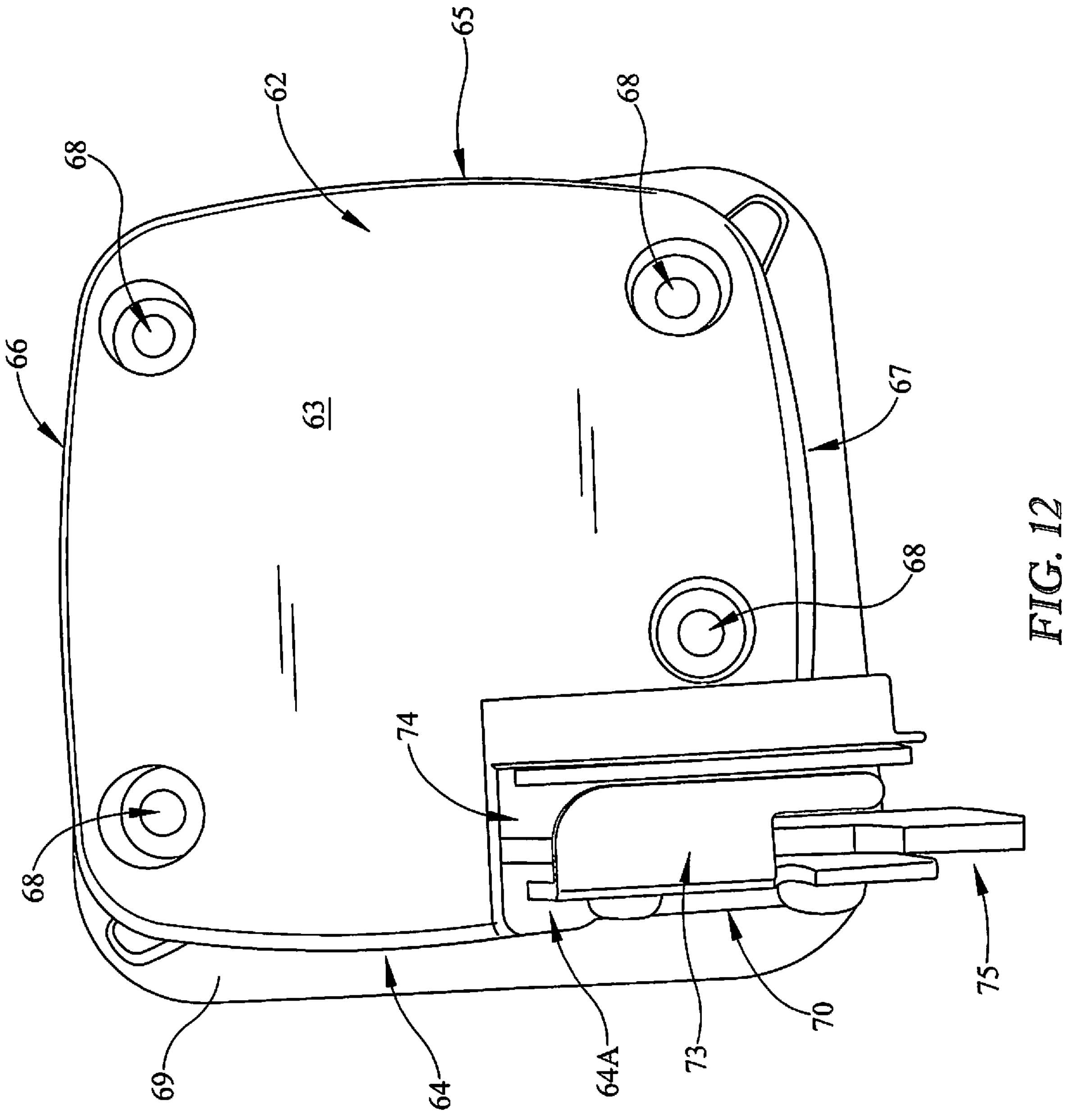
FIG. 12 is a rear view of the second housing and latching mechanism as shown in FIG. 11.
Figure 13:
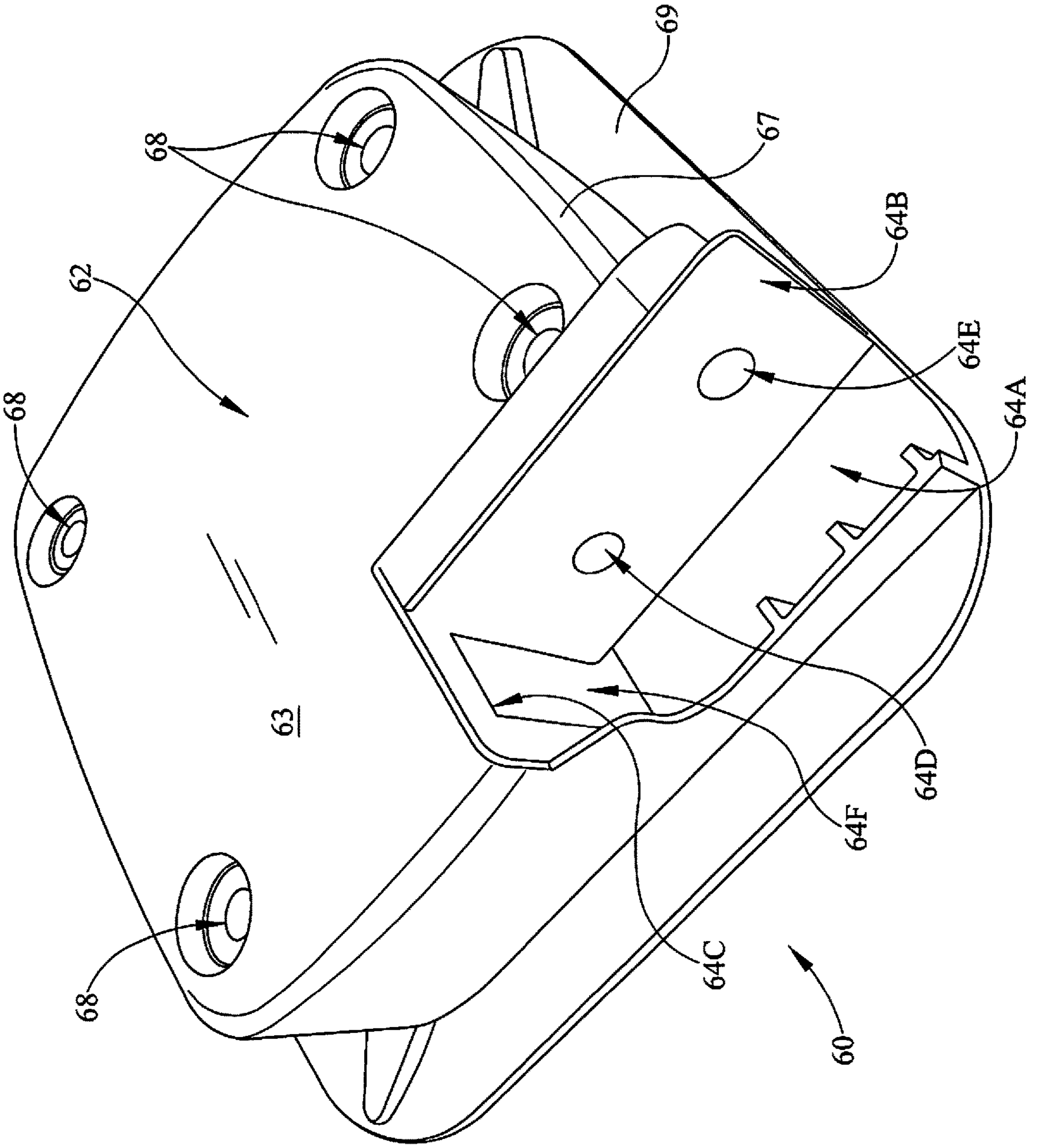
FIG. 13 is a rear perspective view of the second housing shown in FIG. 11 with the latching mechanism removed.
Figure 14:
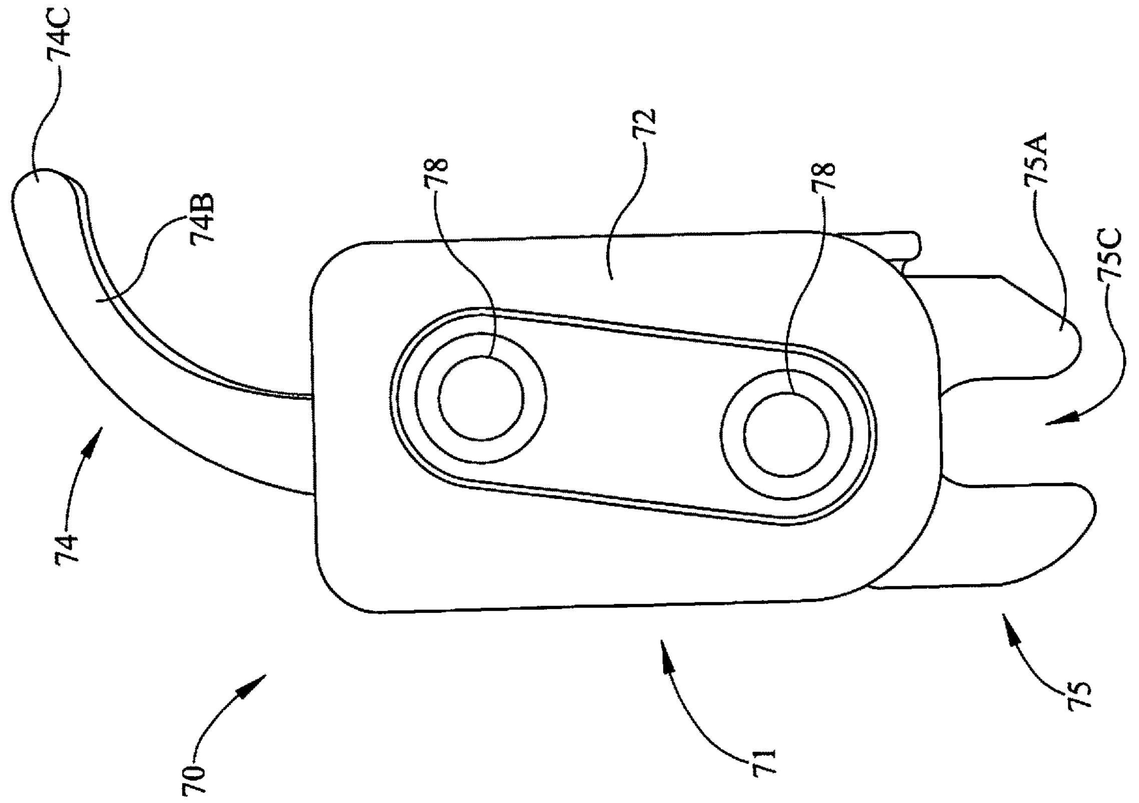
FIG. 14 is a side view of the latching mechanism shown in FIG. 11.
Figure 15:
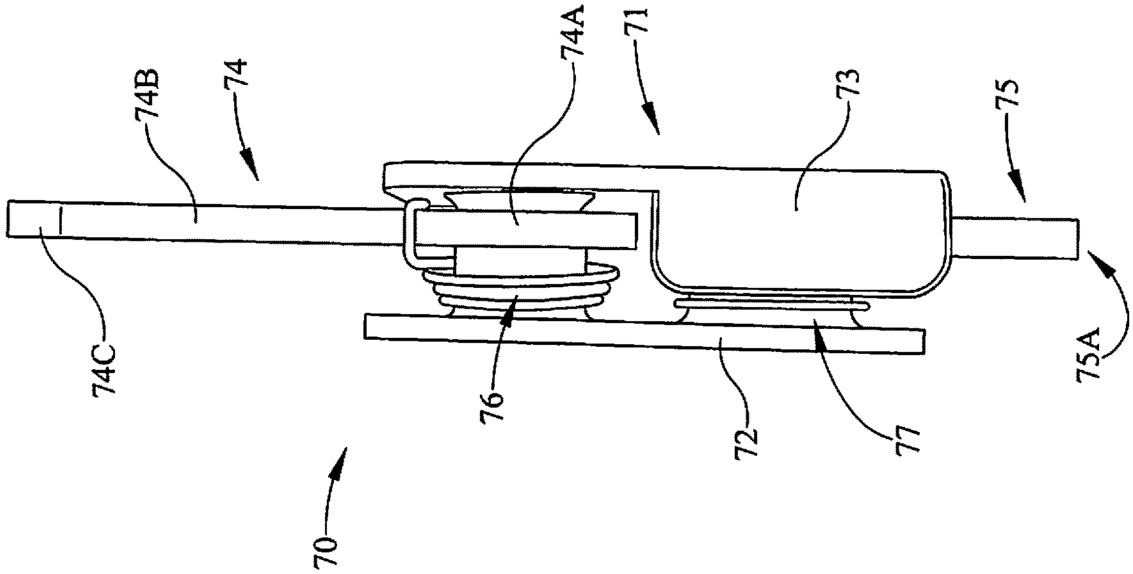
FIG. 15 is a rear view of the latching mechanism shown in FIG. 11.
Figure 16:
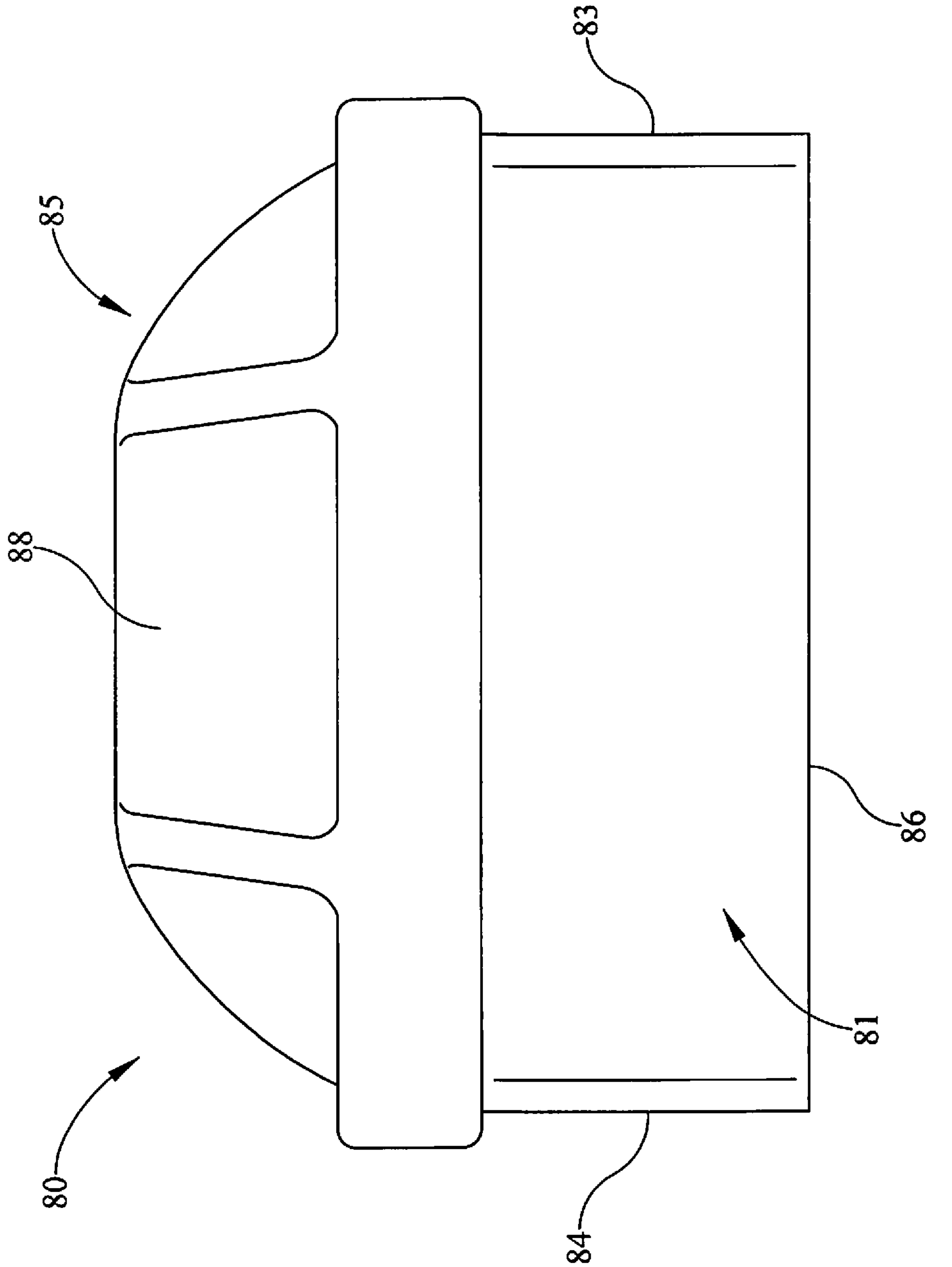
FIG. 16 is a front view of a catch member that is a component of the door handle and locking system shown in FIG. 1.
Figure 17:
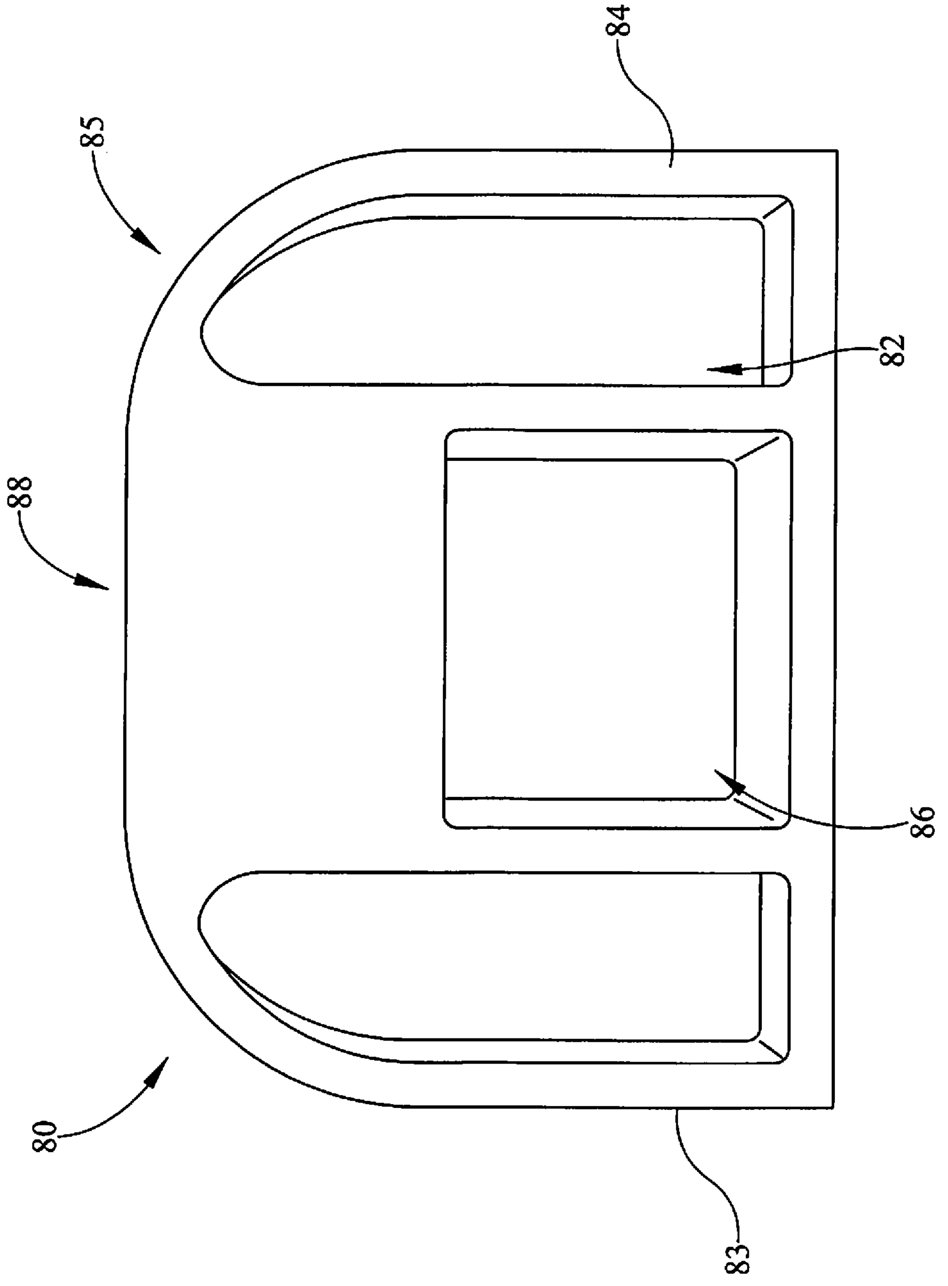
FIG. 17 is a rear view of the catch member shown in FIG. 16.
Figure 18:
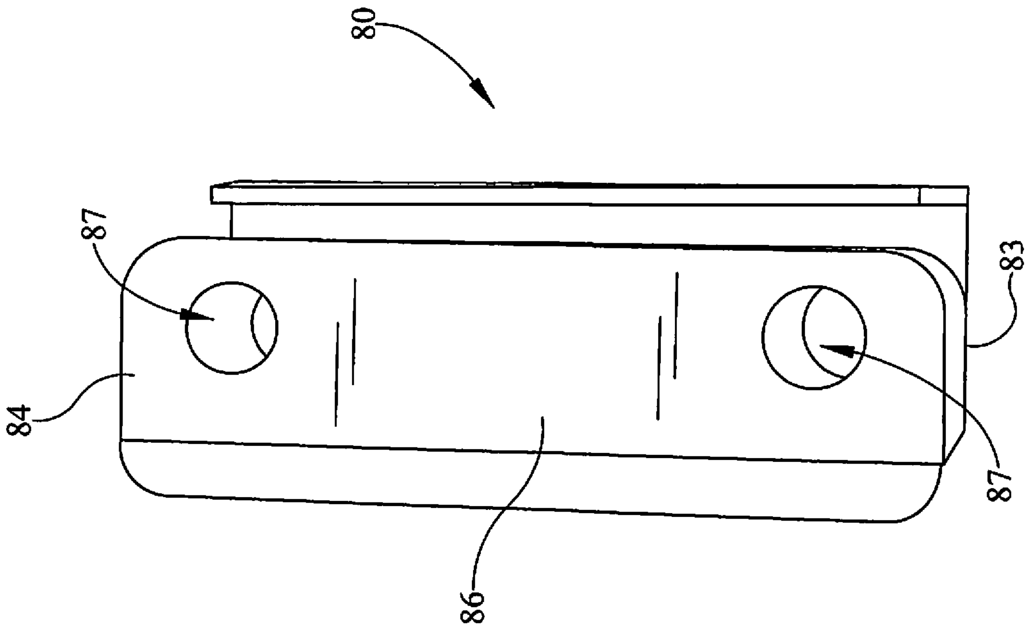
FIG. 18 is a bottom view of the catch member shown in FIG. 17.

Referring to FIGS. 11-13, second housing 60 in the embodiment shown includes a first or outer side 61, a second or inner side 62, a first or rear wall 63, a second or right side wall 64, a third or left side wall 65, a fourth or upper wall 66, a fifth or lower wall 67, a plurality of openings 68, and a flange 69. Second wall 64 includes a recessed area 64A for receiving latching mechanism 70 as described below. Recessed area 64A is bounded by a first wall 64B and a second wall 64C. First wall 64B includes a first opening 64D and a second opening 64E. Second wall 64C includes an opening 64F. Second wall 64, third wall 65, fourth wall 66, and fifth wall 67 extend from first wall 63 toward flange 69 and first side 61 of second housing 60 and form a recessed area 60A. Flange 69 extends outward from and generally perpendicular to second wall 64, third wall 65, fourth wall 66, and fifth wall 67. Flange 69 extends generally parallel to first wall 63. Openings 68 receive fasteners for securing first housing 20 and second housing 60 together as described below.

Referring to FIGS. 11, 12, 14, 15, and 20-21, latching mechanism 70 in the embodiment shown includes a housing 71 having a first member 72 and a second member 73, a cam member 74, a latch member 75, a first biasing member 76, a second biasing member 77, and a pair of retaining members 78. First member 72 and second member 73 each includes a pair of openings (not shown) for receiving retaining members 78 to secure latching mechanism 70 together as described below. Cam member 74 includes a first or body section 74A, a cam arm 74B (having and end 74C) extending from first section 74A, and a retaining projection 74D extending from first section 74A. Latch member 75 includes a first end 75A, a second end 75B, a first notch 75C formed in first end 75A, a second notch 75D formed in second end 75B, and a third notch 75E formed in second end 75B. Retaining members 78 include openings or bores 78A extending therethrough.

To assemble latching mechanism 70, cam member 74, latch member 75, first biasing member 76, and second biasing member 77 are positioned between first member 72 and second member 73 of housing 71 such that (a) projection 74D of cam member 74 is positioned in second notch 75D of latch member 75, (b) openings (not shown) in cam member 74 and first biasing member 76 are aligned with an opening in first member 72 and an opening in second member 73, (c) openings (not shown) in latch member 75 and second biasing member 77 are aligned with an opening in first member 72 and an opening in second member 73, and (d) first biasing member 77 and second biasing member 78 tend to bias projection 74D of cam member 74 and second notch 75D of latch member 75 out of engagement. Retaining members 78 are inserted through the various openings to secure latching mechanism 70 together. Latching mechanism 70 is then positioned in recessed area 64A of second wall 64 of second housing 60 such that openings 78A of retaining members 78 are aligned with first opening 64D and second opening 64E in first wall 64B of recessed area 64A and end 74C of cam arm 74B extends through opening 74F and into recessed area 60A. Fasteners are inserted into openings 78A of retaining members 78 and into first opening 64D and second opening 64E of first wall 64B to secure latching mechanism 70 in recessed area 64A.

Referring to FIGS. 1-3 and 16-18, strike or catch member 80 in the embodiment shown includes a first side 81, a second side, 82, a third side 83, a fourth side 84, a top side 85, a bottom side 86, and openings 87. Top side 85 includes a catch feature 88 configured to engage with latching mechanism 70 as described below. Openings 87 receive fasteners to secure catch member 80 to a surface as described below.

Figure 1:
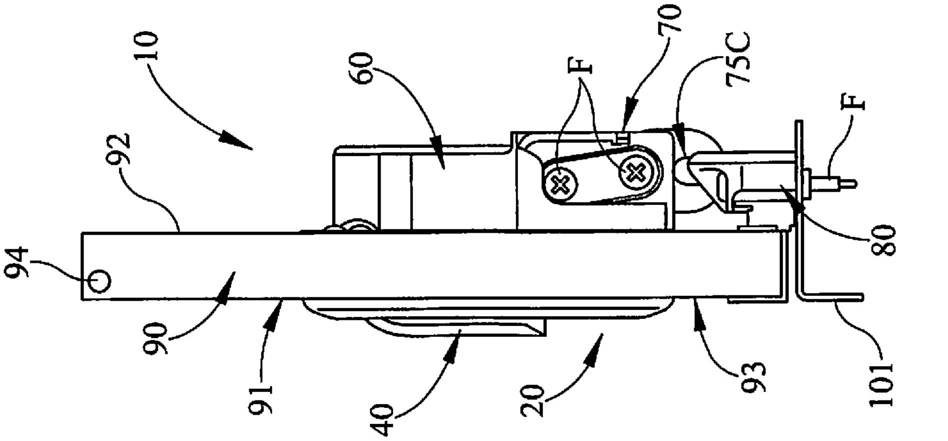
FIG. 1 is a side view of a door handle and locking system according to one embodiment of the present invention secured to a door and in the latched position.
Figure 2:
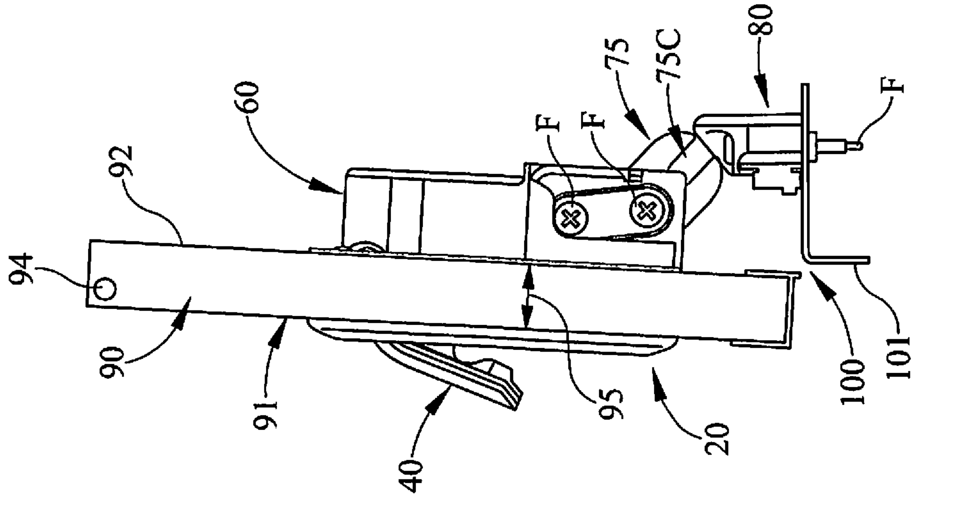
FIG. 2 is a side view of the door handle and locking system shown in FIG. 1 in the unlatched position.

FIGS. 1-3 show door handle and locking system 10 connected to a door 90 as, for example, the door of a vehicle, such as a recreational vehicle. As shown in FIGS. 1-3, door 90 includes a first or outer surface 91, a second or inner surface 92, an opening 93 extending through first surface 91 and second surface 92, a pivot point 94 and a thickness 95. Door 90 is positioned in an opening 100 of a wall, such as a vehicle sidewall, 101. To assemble door handle and locking system 10 to door 90, first housing 20 is positioned such that seal 29A is adjacent first surface 91 of door 90 and bosses 28 extend into opening 93, and second housing 60 is positioned such that flange 69 is adjacent second surface 92 of door 90. Fasteners are then inserted through openings 68 and into openings 28A of bosses 28 so as to secure first house 20 and second house 60 together such that seal 29A is in contact with first surface 91 of door 90 and flange 69 is in contact with second surface 92 of doo 90. Catch member 80 is secured near opening 100 by inserting fasteners F through openings 87 and sidewall 101.

Figure 20:
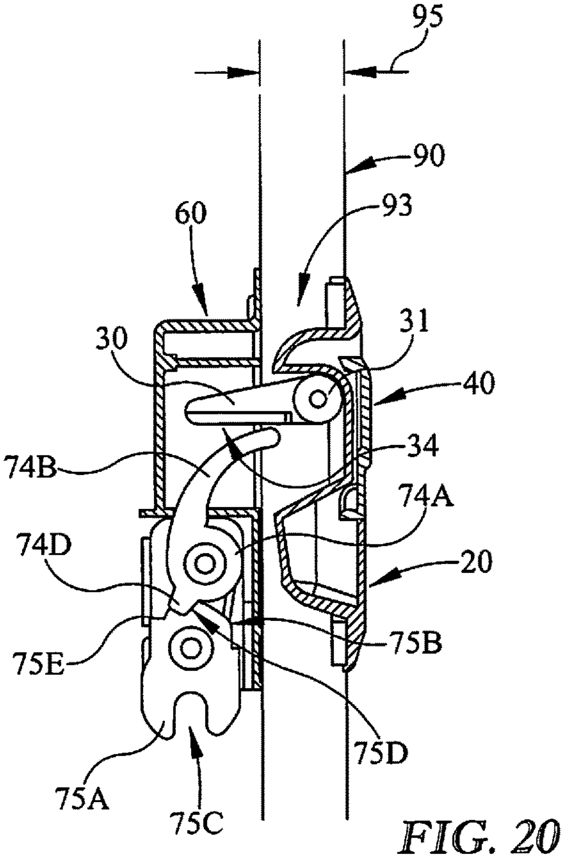
FIG. 20 is a sectional view through line 20-20 in FIG. 19 showing the door handle and locking system shown in FIG. 1 in the latched position as mounted to a door having a thickness.

FIGS. 1 and 20 and 22 show system 10 in the latched position and handle 40 in the unactuated position. In this position, actuator 30 and first notch 75C of latching member 75 extend generally perpendicular to one another, and lower surface 34 of actuator 30 contacts cam arm 74B of cam member 74. Retaining projection 74D is located in second notch 75D of latch member 75. The engagement of retaining projection 74D in second notch 75D resists the biasing force of first biasing member 76 and second biasing member 77 and prevents latch member 75 from rotating. Catch member 80 is connected to sidewall 101 in a position such that when door 90 is closed and handle 40 is not actuated, catch feature 88 is positioned in first notch 75C of latch member 75.

Figure 21:
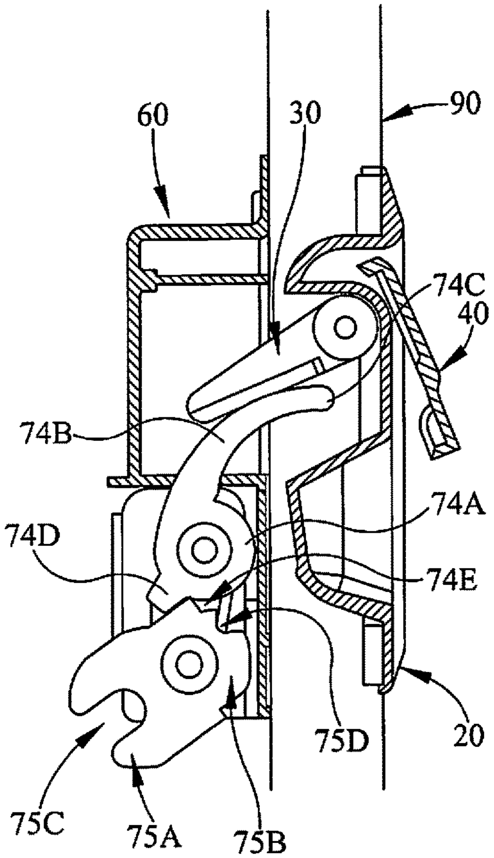
FIG. 21 is a sectional view through line 20-20 in FIG. 19 showing the door handle and locking system shown in FIG. 1 in the unlatched position.

To unlatch door 90, lower side 46 of handle 40 is pulled outwardly as shown in FIGS. 2, 3 and 21 so as to move it away from recessed area 20A. This causes handle 40 and actuator 30 to rotate as shown. Specifically, actuator 30 rotates downwardly, causing lower surface 34 to apply force to cam arm 74B of cam member 74. This causes cam arm 74B to move along lower surface 34 and pivot cam member 74 in a clockwise direction. As this occurs, retaining projection 74D disengages from second notch 75D of latch member 75. This in turn causes latch member 75 to rotate in a clockwise direction under the biasing force of second biasing member 77, which disengages first notch 75C from catch feature 88 of catch member 80, thereby unlatching door 90 and permitting it to be opened. Note that as first notch 75C disengages from catch feature 88 of catch member 80, first end 75A of latching member 75 pushes against catch member 80 and urges door 90 outward from opening 100 under the biasing force of second biasing member 77. This assists the user in opening door 90.

Note that the door handle and locking system of the present invention can be applied to doors 90 having different thicknesses. For example, FIG. 20 shows door handle and locking system 10 of the present invention used with a door 90 having a thickness 95 that is less than the thickness 95 of door 90 of FIG. 21. Because door 90 of FIG. 20 is thinner than door 90 of FIG. 21, cam arm 74B of cam member 74 contacts lower surface 34 of actuator 30 farther from second end 32 of actuator 30 than it does when utilized in connection with the thicker door 90 of FIG. 21. This allows door handle and locking system 10 of the present invention to be utilized with doors of differing thicknesses without changing the length of actuator 30 and/or cam arm 74B.

To close door 90, handled 40 is released and door 90 is moved toward opening 100 in sidewall 101. When door 90 is moved a sufficient amount, contact between first end 75A of latch member 75 and catch member 80 will cause latch member 75 to rotate in the counterclockwise direction, thereby causing second end 75B of latch member 75 to contact retaining projection 74D of cam member 74. This contact causes cam member 74 to rotate in a clockwise direction until retaining projection 74D engages third notch 75E of latch member 75. In this position, first notch 75C will partially engage with catch feature 88 of catch member 80. Door 90 will thus be held in a relatively closed position even if latching mechanism 70 is not fully engaged. Further movement of door 90 toward opening 100 will cause latching mechanism 70 to return to the fully engaged position with retaining projection 74D located in second notch 75D of latch member 75 as shown in FIGS. 1, 20 and 22.

Although the present invention has been shown and described in detail, the same is by way of example only and should not be taken as a limitation on the invention. Numerous modifications can be made to the embodiments disclosed without departing from the scope of the present invention.

What is claimed is:

1. A door handle and locking system, including:

an exterior housing having an outer side, an inner side, a rear wall, a first side wall having an opening, a second side wall having an opening, and a recessed area;

a handle located in the recessed area of the exterior housing and moveable between a latched position and an unlatched position, the handle having an outer side, an inner side, a first side, a second side, an upper side, and a lower side, a first arm extending from the inner side of the handle, the first arm having an opening aligned with the opening in the first side wall of the exterior housing, the opening of the first arm having a configuration, a second arm extending from the inner side of the handle, the second arm having an opening aligned with the opening in the second side wall of the exterior housing, the opening in the second arm having a configuration, and an opening extending through the inner side and the outer side of the handle;

a biasing member located on the second side of the exterior housing, the biasing member having a retainer and a spring;

the retainer having a post having a configuration corresponding to the opening in the first arm of the handle, an opening, and an arm, the post extending into the opening in the second side wall of the handle and into the opening in the second arm of the handle and oriented such that the post does not rotate within the opening in the second arm of the handle;

the spring positioned around the post on one side of the arm of the retainer and engaging the arm of the retainer;

an actuator having a boss having a configuration corresponding to the configuration of the opening in the second arm of the handle, an opening in the boss, a first surface, and a length, the actuator located on the second side of the exterior housing with the boss extending into the opening in the first side wall of the exterior housing, into the opening in the first arm of the handle and oriented such that the boss does not rotate within the opening in the first arm of the handle;

a first fastener extending into the opening in the boss, the opening in the first side wall of the exterior housing, and the opening in the first arm of the handle, and a second fastener extending into the opening in the retainer, the opening in the second side wall of the exterior housing and the opening in the second arm of the handle such that the handle is pivotally connected to the exterior housing, the biasing member biases the handle into the closed position with the actuator extending substantially perpendicular to the rear wall of the exterior housing, and the actuator and the retainer rotate with movement of the handle between the latched position and the unlatched position;

a lock located in the opening extending from the inner side of the handle to the outer side of the handle, the lock selectively moveable between a locked position and an unlocked position;

an interior housing having an outer side, an inner side, a rear wall, a first side wall, a second side wall, an upper wall, and a lower wall, the second side wall having a first recessed area having an opening, and the interior housing having a second recessed area;

a latching mechanism moveable between a latched position and an unlatched position, the latching mechanism having a housing, a cam member located in the housing, a latch member located in the housing, a first biasing member located in the housing, and a second biasing member located in the housing;

the cam member having a body section, a cam arm extending from the body section and having a first end, and a retaining projection extending from the body section;

the latch member having a first end, a second end, a first notch formed in the first end, a second notch formed in the second end and a third notch formed in the second end;

the housing of the latch mechanism located on the inner side of interior housing and in the first recessed area of the interior housing such that the cam arm extends from the inner side of the interior housing and through the opening in the first recessed area of the interior housing and the end of the cam arm is located on the outer side of the interior housing and in the second recessed area of the interior housing;

a catch member having a catch feature configured to engage the latching mechanism when the latching mechanism is in the latched position;

wherein when the latching mechanism is in the latched position, the retaining projection of the cam member is located in the second notch of the latch member, the catch feature of the catch member is located in the first notch of the latch member, and the first biasing member and second biasing member bias the retaining projection of the cam member and the second notch of the latch member out of engagement; and wherein moving the handle from the latched position to the unlatched position rotates the actuator so as to apply force to the cam arm and cause the cam arm to move along the lower surface of the actuator, thereby pivoting cam member in a first direction and disengaging the retaining projection from the second notch of the latch member and causing rotation of the latch member in the first direction under the biasing force of the second biasing member to disengage the first notch of the latch member from the catch feature.

2. The door handle and locking system according to claim 1, wherein the first end of the latch member bears against the catch member as the first notch disengages from the catch feature and urges the latch member away from the catch member.

3. The door handle and locking system according to claim 1, wherein urging the first end of the latch member into engagement with the catch feature causes the latch member to rotate in a second direction, thereby causing the second end of the latch member to contact the retaining projection of the cam member and rotate the cam member in the first direction until the retaining projection engages the third notch of the latch member and the first notch of the latch member partially engages the catch feature.

4. The door handle and locking system according to claim 1, wherein the exterior housing is configured to be connected to the exterior side of a first door having a thickness and to the exterior side of a second door having a thickness different from the thickness of the first door, the interior housing is configured to be installed on the interior side of the first door and on the interior side of the second door, and the cam arm and actuator are configured to engage at a first location when the interior housing and the exterior housing are installed on the first door and to engage at a second location when the exterior housing and interior housing are installed on the second door.

* * * * *